United States Patent [19]

Laxo

[11] 4,015,621
[45] Apr. 5, 1977

[54] PRESSURE CONTROL AND FLUID VENTING SYSTEM FOR A PRESSURIZED CONTAINER

[75] Inventor: Darryl E. Laxo, Novato, Calif.

[73] Assignee: The United States of America as represented by the Secretary of the Navy, Washington, D.C.

[22] Filed: Mar. 18, 1976

[21] Appl. No.: 667,914

[52] U.S. Cl. .............................. 137/173; 137/423
[51] Int. Cl.² ...................................... F16K 24/00
[58] Field of Search .......... 137/172, 173, 174, 423; 114/16 R, 16 D

[56] References Cited
UNITED STATES PATENTS 2,701,620  2/1955  Crawford ..................... 137/172 X Primary Examiner—Alan Cohan
Attorney, Agent, or Firm—R. S. Sciascia; Charles D. B. Curry; James M. Skorich

[57] ABSTRACT

A system to maintain the pressure within a pressurized container within design limits and to vent undesirable fluids to the ambient atmosphere. A float floats near the top of the container on the surface of oil supplied to the container by a pressure compensator and is seated to seal an opening as long as the oil level remains above a given level. Sufficient displacement of the oil by gases generated within the container will unseat the float to allow the venting of such gases to the ambient atmosphere. Another opening is also located in the top of the container and is sealed by a weighted lid. If the pressure in the container exceeds the local ambient atmospheric pressure by an amount that would otherwise rupture the container, the lid will be forced open to allow the relief of the excess pressure. When seated, another float seals an opening located in the bottom of the container. This float will float on atmospheric fluid which accumulates in the bottom of the container. If a given level of accumulated atmospheric fluid is exceeded, the float will become unseated to allow the venting of such fluid. Should the internal pressure of the container drop sufficiently below the local ambient atmospheric pressure, the two floats will unseat to permit the entry of atmospheric fluid to equalize the pressures and prevent the container from being crushed.

7 Claims, 2 Drawing Figures

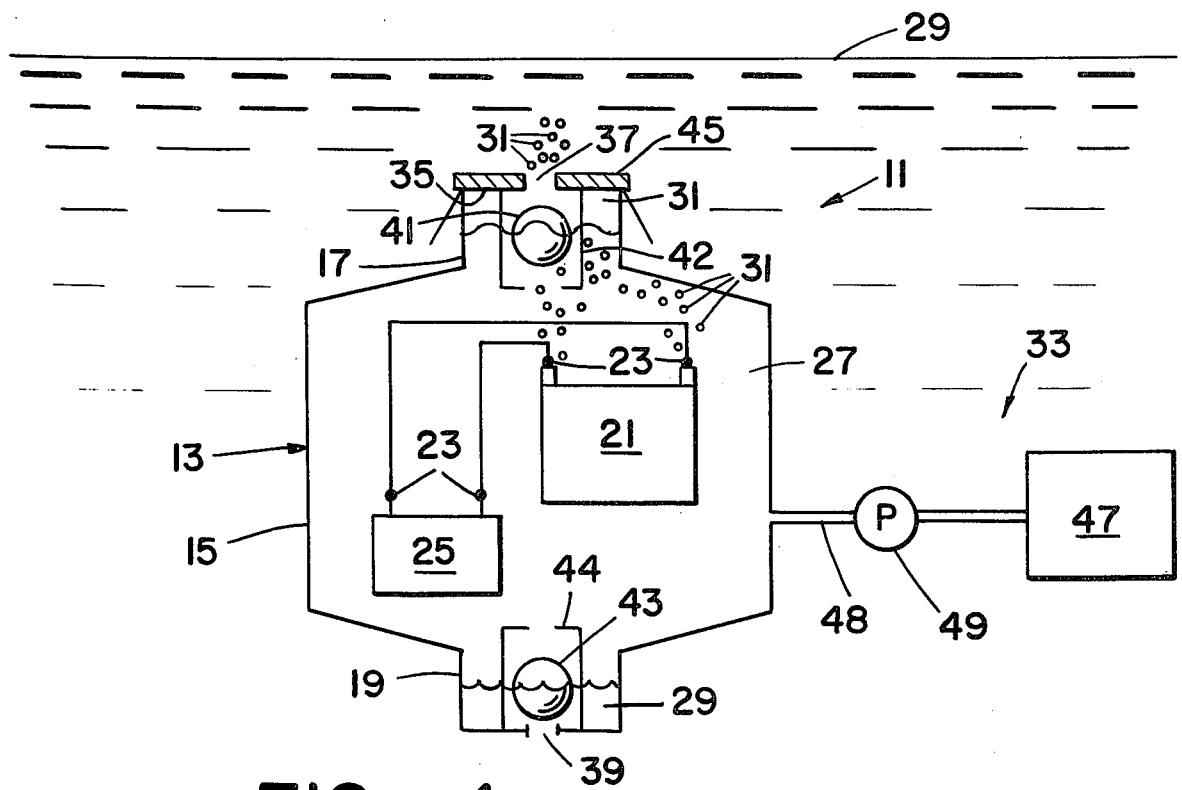
FIG _ 1
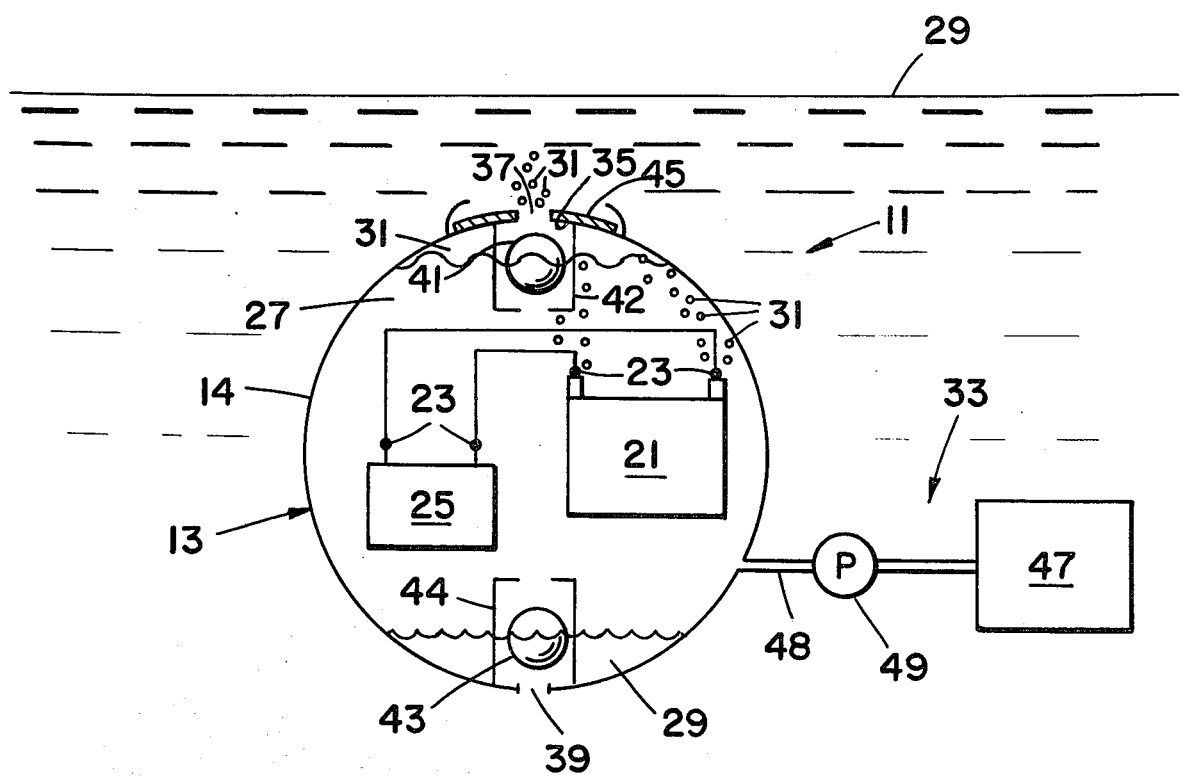
FIG _ 2

PRESSURE CONTROL AND FLUID VENTING SYSTEM FOR A PRESSURIZED CONTAINER

BACKGROUND OF THE INVENTION

1. Field of the Invention

This invention relates to pressure control and fluid venting devices, and particularly to systems for simultaneously controlling the pressure and the respective volumes of several fluids within a pressurized container.

2. Description of the Prior Art

In submersible vehicles, electrical equipment, including a battery, is usually housed in an oil filled container which is exposed to the ambient ocean pressure. The internal container pressure is kept just above the local ambient pressure to prevent the container from collapsing (or bursting) by a pressure compensator which pumps (or withdraws) oil from the container as necessary. Several problems have arisen from the normal functioning of the electrical equipment located within such a container: the battery, in discharging, generates $O_2$ and $H_2$ gases which displace the oil. Should such gases be allowed to accumulate, the electrical circuits would no longer be submerged in oil and a spark could easily cause an explosion of the trapped gases. If the vehicle is brought to the surface too quickly, the pressure compensator may not have sufficient time to react to lower the internal pressure by withdrawing oil; such could result in the rupture of the container. If the vehicle submerges too quickly to allow the compensator to pump a sufficient quantity of oil into the container, the container could be crushed by the ocean pressure. Water that leaks into the container could, if allowed to accumulate and reach a high enough level, cause corrosion of the electrical contacts and equipment housed inside the container.

Presently, pressurized containers are equipped with valves which provide pressure relief in the situation where the vehicle rises too quickly and also vents internally generated gases. However, such valves are spring loaded, complex, and require precision machining. In addition, the present systems fail to provide a means for quickly increasing the internal pressure in the event of a rapid descent. Nor do they provide a means for venting any water that leaks into the container.

The present invention is a mechanically simple, yet reliable and effective system for providing a pressure compensated container with pressure relief and fluid venting. It also provides for quick pressure compensation in the event of a rapid increase in the ambient pressure, as well as providing for the venting of any water.

SUMMARY OF THE INVENTION

Briefly, the present invention comprises a system which is a mechanically simple, yet reliable and effective means for providing pressure control and fluid venting for a container that is kept pressurized by a compensator which pumps a compensating fluid, typically oil, from a reservoir.

A float floats near the top of the container on the surface of oil supplied to the container by a pressure compensator and is seated to seal an opening as long as the oil level remains above a given level. Sufficient displacement of the oil by gases generated within the container will unseat the float to allow the venting of such gases to the ambient atmosphere. The float will remain unseated until the compensator raises the level of the compensating fluid high enough to again seat the float.

Another opening is also located in the top of the container and is sealed by a weighted lid. If the pressure in the container exceeds the local ambient atmospheric pressure by an amount that would otherwise rupture the container, the lid will be forced open to allow the relief of the excess pressure.

A third opening is located in the bottom of the container. It is sealed by a float having a greater density than the compensating fluid, but floats on the atmospheric fluid. If the amount of atmospheric fluid that has accumulated in the bottom of the container reaches a given level, the float will become unseated to allow the venting of the atmospheric fluid from the container.

Should the internal pressure of the container drop sufficiently below the local ambient atmospheric pressure, the two floats will unseat to permit the entry of atmospheric fluid to equalize the pressures and prevent the container from being crushed.

STATEMENT OF THE OBJECTS OF THE INVENTION

An object of the present invention is to vent fluids generated within a container to the external atmosphere.

Another object is to provide a container with means for pressure relief.

Yet another object is to prevent a container from being crushed by external ambient pressure.

A further object is to vent any accumulated atmospheric fluid from a container to the ambient atmosphere.

Still another object is to provide a pressure compensated container with mechanically simple yet reliable and effective means for preventing the container from being crushed by ambient pressure; for relieving internal pressures; for venting internally generated fluids; and for venting accumulated atmospheric fluids, whether such occur individually or simultaneously, in any combination or altogether.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a drawing showing the preferred embodiment of the present invention operatively installed in a cylindrical container; and FIG. 2 is a drawing showing the preferred embodiment of the present invention operatively installed in a spherical container.

DESCRIPTION OF THE PREFERRED EMBODIMENT

FIG. 1 shows the preferred embodiment of pressure control and venting system 11 installed on pressure compensated container 13. Container 13 is operatively attached to a submersible vehicle (not shown) and is shown exposed to an ocean environment.

Container 13 is made up of three vertically stacked cylinders including main cylinder 15, top cylinder 17, and bottom cylinder 19. Battery 21, electrical contacts 23, and electrical equipment 25 are situated in main cylinder 15. Also contained in container 13, in variable quantities, are oil 27, water 29, and fluid 31.

Pressure compensation system 33 includes oil reservoir 47, tube 48, and pump 49. Tube 48 communicates, respectively, between container 13, pump 49, and reservoir 47. Compensation system 33 functions to maintain the pressure inside container 13 just above the local ambient ocean pressure. Such is accomplished by means of a pressure gauge (not shown) operatively connected to pump 49 which actuates pump 49 to pump oil 27 from reservoir 47 into container 13 or from container 13 into reservoir 47.

System 11 includes openings 35, 37, and 39 in container 13, floats 41 and 43, float cages 42 and 44, and weighted lid 45. Opening 35 is circular and located in the top of top cylinder 17. It is sealed when weighted lid 45 is seated about the periphery of the opening. When the local ambient ocean pressure decreases faster than the internal container pressure can be relieved by compensation system 33, for instance, during a rapid rise towards the ocean surface, the pressure differential may reach a value which threatens the structural integrity of cylinder 13. The weight of weighted lid 45 is such that it will lift off from its seated position to allow the escape of fluid 31 and/or oil 27 to relieve the excess container pressure before such a differential is achieved. Lid 45 will again become seated to prevent the entry of water 29 when the pressure differential drops to a safe level.

Opening 37 is circular and located in lid 45. Float 41 is spherical and has a diameter greater than that of opening 37. Float 41 has a density greater than that of fluid 31, but less than that of oil 27, so that it floats on the surface of oil 27.

Cage 42, fixedly attached to lid 45, prevents float 41 from moving laterally with respect to opening 37 should cylinder 13 roll from a vertical orientation (as shown in FIG. 1) about an axis perpendicular to its axis of revolution. Cage 42 is porous, and preferably made from plastic or wire.

Float 41 will be seated in opening 37, effectively sealing it, as long as the level of oil 27 is high enough. As fluid 31 is typically gaseous $H_2$ and $O_2$ generated by battery 21, this design level should be sufficient to keep battery 21, contacts 23, and equipment 25 completely submerged in oil 27, with a margin for safety, to prevent an explosion from being ignited by a spark from contacts 23. Should the level of oil 27 drop below the aforementioned design level due to displacement of oil 27 by fluid 31, float 41 will become unseated and allow the venting of fluid 31 into the surrounding ocean (as the pressure in container 13 is maintained above the local ambient ocean pressure by compensator 33).

The escape of fluid 31 will cause the pressure in container 13 to drop. This drop will trigger the pumping of oil 27 into container 13 by compensator 33, and such will cause the oil level to rise and re-seat float 41 in opening 37.

Opening 39 is circular and located in the bottom of bottom cylinder 19. Float 43 is spherical and has a diameter greater than that of opening 39. Float 43 has a density greater than that of oil 27, but less that of water 29, so that it will remain near the bottom of container 13 yet float on the surface of any water 29 inside container 13.

Cage 44, fixedly attached to the bottom wall of bottom cylinder 19, prevents float 43 from moving laterally with respect to opening 39 should cylinder 13 roll from a vertical position about an axis perpendicular to its axis of revolution. Cage 44 is porous, and preferably made from plastic or wire.

Float 43 will be seated in opening 39, effectively sealing it, as long as the level of water 29 remains insufficient to float float 43. This level will be low enough to prevent any water 29 that has accumulated in the bottom of container 13 from coming into contact with electrical contacts 23 or equipment 25, as such contact, especially if of a sustained duration, could cause corrosion and deleteriously effect the normal functioning of such equipment and electrical contacts.

Should the level of accumulated water 29 become high enough to float float 43, e.g., due to leakage from the operation of lid 45 and/or float 41, the pressure differential between container 13 and the local ambient ocean will force the venting of such accumulated water 29 through opening 39 until float 43 is again seated. Compensator 33 will subsequently pump oil 27 into container 13 to maintain the desired pressure differential.

Floats 41 and 43 will normally operate to vent accumulated fluids as hereinbefore discussed. However, should the environmental pressure increase at a rate that cannot be matched by compensator 33, e.g., if the submersible vehicle to which container 13 is attached descends at a very rapid rate, floats 41 and 43 will become unseated to allow water 29 to enter container 13 through openings 37 and 39, respectively, and thereby equalize the container pressure with that of the local environment. This mechanism will prevent container 13 from being crushed in such a situation. Such admitted water 29 will then be vented through opening 39 as hereinbefore discussed in detail.

FIG. 2 shows pressure control and fluid venting system 11 installed in spherical container 14. The reference numbers designate the same items as were referred to by such numbers in FIG. 1. The items cooperate in the same manner as hereinbefore discussed in detail.

What is claimed is:
1. A pressure control and fluid venting system for a pressurized container comprising:
 a. first, second, and third openings in the walls of said container communicating with the fluid of an ambient atmosphere below the surface of a body of water;
 b. a first float, a second float, and a lid;
 c. said first float sealing said first opening when it is seated, said second float sealing said second opening when it is seated, and said lid sealing said third opening when it is seated;
 d. said container containing a first fluid, a second fluid, and said atmospheric fluid;
 e. said first fluid having a density less than either the density of said second fluid or said atmospheric fluid and said second fluid having a density less than that of said atmospheric fluid;
 f. said first float having a density greater than said first fluid and less than said second fluid, and said second float having a density greater than said second fluid and less than said atmospheric fluid;
 g. said lid weight being sufficient to keep said lid seated unless the pressure in said container exceeds the local pressure of said ambient atmosphere by a predeterminable value; whereby
 h. when the level of said second fluid drops below a given level, said first float unseats and allows the venting of said first fluid; when the level of said atmospheric fluid reaches a given level, said second float unseats and allows the venting of said atmospheric fluid; when the internal pressure of said container exceeds the local pressure of said ambient atmosphere by an amount which approaches a value which would rupture said container, said lid unseats and allows the relief of said pressure; and when the local pressure of said ambient atmosphere exceeds the internal pressure of said container by an amount which approaches a value which would crush said container, said first float and said second float unseat to permit the entry of said atmospheric fluid to equalize the pressures.

2. The pressure relief and fluid venting system recited in claim 1 wherein:
   a. said container is connected to a pressure compensation means;
   b. said compensation means includes a fluid pumping means, a fluid reservoir, a communicating means, and a compensating fluid;
   c. said compensating fluid is said second fluid;
   d. said reservoir contains a volume of said second fluid and communicates with said container by means of said communicating means; whereby
   e. the internal pressure necessary to maintain the structural integrity of said container is maintained by the pumping of said second fluid between said reservoir and said container by means of said communicating means and said pump.

3. The pressure relief and fluid venting system recited in claim 2 wherein:
   a. said first and second floats are restrained to move only axially with respect to said first and second openings, respectively; whereby
   b. lateral movement of said first and second floats with respect to said first and second openings, respectively, that might otherwise be caused by the rolling of said container and result in said floats being inadvertently unseated is prevented.

4. The pressure relief and fluid venting system as recited in claim 3 wherein:
   a. said ambient fluid is water;
   b. said first fluid is a gas; and
   c. said second fluid is oil.

5. The pressure relief and fluid venting system as recited in claim 1 wherein:
   a. said container consists of a large cylinder, a first cylinder, and a second cylinder;
   b. said first and second cylinders having diameters less than that of said large cylinder;
   c. said large cylinder being operationally oriented with its axis of revolution being about vertical;
   d. said large cylinder having a top surface and a bottom surface;
   e. said first cylinder being located with one end adjoining said top surface with its axis of revolution coinciding with the axis of revolution of said large cylinder and with its non-adjoining end being flat;
   f. said second cylinder being located with one end adjoining said bottom surface with its axis of revolution coinciding with the axis of revolution of said large cylinder and with its non-adjoining end being flat;
   g. said first and third openings being located in said non-adjoining end of said first cylinder; and
   h. said second opening being located in said non-adjoining end of said second cylinder.

6. The pressure relief and fluid venting system as recited in claim 5 wherein:
   a. said first opening is located in said lid.

7. The pressure relief and fluid venting system as recited in claim 6 wherein:
   a. said container is spherical.

* * * * *